(12) United States Patent
Hirasawa et al.

(10) Patent No.: US 8,505,499 B2
(45) Date of Patent: Aug. 13, 2013

(54) COOLING SYSTEM FOR CONSTRUCTION MACHINE

(75) Inventors: Shigeru Hirasawa, Mito (JP); Makoto Matsushita, Ushiku (JP); Tomonori Mamada, Kazo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 288 days.

(21) Appl. No.: 12/851,008

(22) Filed: Aug. 5, 2010

(65) Prior Publication Data

US 2011/0088637 A1 Apr. 21, 2011

(30) Foreign Application Priority Data

Oct. 16, 2009 (JP) .................................. 2009-239203

(51) Int. Cl.
*F01P 1/06* (2006.01)
(52) U.S. Cl.
USPC .................. 123/41.31; 123/41.01; 123/41.34; 123/41.49; 123/41.11; 123/41.63
(58) Field of Classification Search
USPC ............ 123/41.31, 41.3, 43.34, 41.01, 41.49, 123/41.11, 41.63, 41.65
See application file for complete search history.

(56) References Cited

U.S. PATENT DOCUMENTS

| | | | | |
|---|---|---|---|---|
| 2,444,951 A | * | 7/1948 | Paget | 165/235 |
| 3,794,111 A | * | 2/1974 | Blomgren et al. | 165/96 |
| 4,696,156 A | * | 9/1987 | Burr et al. | 60/39.08 |
| 6,129,056 A | * | 10/2000 | Skeel et al. | 123/41.49 |
| 8,162,087 B2 | | 4/2012 | Kobayashi et al. | |
| 2003/0056404 A1 | * | 3/2003 | Iwasa et al. | 37/347 |
| 2003/0156937 A1 | * | 8/2003 | Brown et al. | 414/685 |
| 2005/0006048 A1 | * | 1/2005 | Vuk | 165/41 |
| 2005/0223706 A1 | * | 10/2005 | Mitchell et al. | 60/606 |
| 2006/0137587 A1 | * | 6/2006 | Aisenbrey | 114/65 R |
| 2007/0012000 A1 | * | 1/2007 | Maas et al. | 55/385.3 |
| 2007/0114300 A1 | * | 5/2007 | Green | 239/128 |

FOREIGN PATENT DOCUMENTS

| | | |
|---|---|---|
| JP | 2005-120979 A | 5/2005 |
| JP | 2006-224812 A | 8/2006 |
| JP | 2006-291601 A | 10/2006 |
| WO | 2009/101935 A1 | 8/2009 |

* cited by examiner

*Primary Examiner* — Noah Kamen
*Assistant Examiner* — Long T Tran
(74) *Attorney, Agent, or Firm* — Mattingly & Malur, PC

(57) ABSTRACT

A radiator and an oil cooler are arranged at a front surface side of a cooling fan in parallel with each other in a flow direction of the cooling air, an intercooler and a condenser are arranged in parallel at a front surface side of the radiator and oil cooler, and a fuel cooler is arranged at a front surface side of the condenser. By arranging respective heat exchangers such that the heat release amount thereof sequentially increases from the upstream side toward the downstream side in the flow direction of the cooling air, each heat exchanger can efficiently release the heat of the fluid to be cooled. By arranging the fuel cooler at the front surface side of the condenser, two heat exchangers of the condenser and the fuel cooler can be accommodated within a range of the thickness dimension of the intercooler.

11 Claims, 8 Drawing Sheets

COOLING SYSTEM FOR CONSTRUCTION MACHINE

TECHNICAL FIELD

The present invention relates to a construction machine such as a hydraulic excavator and the like, and particularly to a construction machine equipped with a radiator, an oil cooler, an intercooler, a condenser of an air conditioner and a fuel cooler.

BACKGROUND ART

In general, a hydraulic excavator as a representative example of a construction machine is largely constituted by an automotive lower traveling structure, an upper revolving structure swingably mounted on the lower traveling structure, and a working mechanism liftably mounted at a front side of the upper revolving structure.

The upper revolving structure is largely constituted by a revolving frame as a support structural body, a cab located at a front side of the revolving frame for an operator to get on, an engine mounted at a rear side of the revolving frame, a hydraulic pump which is driven by the engine to pressurize operating oil for supply, a cooling fan which is rotated by the engine to suck in outside air as the cooling air, and various types of heat exchangers provided to oppose a front surface side of the cooling fan.

A radiator for cooling engine cooling water, an oil cooler for cooling operating oil, an intercooler for cooling intake air supplied from a supercharger provided on the engine and a condenser constituting an outdoor machine of an air conditioner provided on the cab for cooling a coolant are disposed as various types of heat exchangers.

Nowadays, it is necessary to meet exhaust gas regulations by improving a fuel efficiency of the engine to reduce an emission amount of carbon dioxide. Therefore, for stabilizing a mixture ratio of fuel supplied to the engine, a fuel cooler for cooling the fuel is provided (Patent Literature 1: Japanese Patent Laid-Open No. 2006-224812 A).

SUMMARY OF THE INVENTION

Incidentally in recent hydraulic excavators, the upper revolving structure is formed in a compact size in such a manner as to be accommodated substantially within a vehicle width of the lower traveling structure for the purpose that the upper revolving structure can revolve even in a narrow working site. In consequence, a space at the front surface side of the cooling fan where the radiator, the oil cooler, the intercooler and the condenser are disposed is narrowed. Therefore, in a case of further disposing the fuel cooler in this narrow space, there occurs a problem with difficulty of maintaining cooling performance of each heat exchanger.

In view of the above-discussed problem with the conventional art, it is an object of the present invention to provide a construction machine in which a radiator, an oil cooler, an intercooler, a condenser and a fuel cooler can be disposed in a narrow space to maintain cooling performance of each heat exchanger.

(1) A construction machine according to the present invention comprises an automotive vehicle body, a cab provided on the vehicle body and equipped with an indoor machine in an air conditioner supplying conditioned air, an engine provided on the vehicle body and equipped with a supercharger, a hydraulic pump which is driven by the engine to pressurize operating oil for supply, a cooling fan which is rotated by receiving a power from a power source to suck in outside air as the cooling air and a heat exchanger unit for cooling a liquid by cooling air generated by the cooling fan, the heat exchanger unit includes a radiator for cooling engine cooling water, an oil cooler for cooling operating oil, an intercooler for cooling intake air supplied from the supercharger in the engine, a condenser serving as an outdoor machine of the air conditioner for cooling a coolant and a fuel cooler for cooling fuel to be supplied to the engine.

For solving the aforementioned problem, a characteristic feature of the present invention lies in that the radiator and the oil cooler are positioned at a front surface side of the cooling fan which is an upstream side in a flow direction of the cooling air by the cooling fan and arranged in parallel with each other in the flow direction of the cooling air, the intercooler and the condenser are arranged in parallel with each other at a front surface side of the radiator and the oil cooler which is the upstream side in the flow direction of the cooling air than the radiator and the oil cooler, and the fuel cooler is arranged at a front surface side of the condenser which is the upstream side in the flow direction of the cooling air than the condenser.

According to this arrangement, the radiator and the oil cooler, each having a large heat release amount, are arranged at the front surface side of the cooling fan which is the downstream side of the flow direction of the cooling air, and the intercooler and the condenser, each having a heat release amount smaller than each of the radiator and the oil cooler, are arranged at the front surface side of the radiator and the oil cooler. The fuel cooler having the smallest heat release amount among these heat exchangers is arranged at the front surface side of the condenser.

In consequence, since the respective heat exchangers can be arranged such that the heat release amount sequentially increases from the upstream side toward the downstream side in the flow direction of the cooling air, each heat exchanger can efficiently release the heat of the fluid to be cooled. In general, since each of the condenser and the fuel cooler has a thickness dimension smaller than that of the intercooler, when the fuel cooler is arranged at the front surface side of the condenser, two heat exchangers can be substantially accommodated within a range of the thickness dimension of the intercooler.

As a result, the radiator, the oil cooler, the intercooler, the condenser and the fuel cooler can be arranged in a compact size and these heat exchangers can be arranged in a narrow space on the vehicle body. Besides, since the respective heat exchangers are arranged in consideration of the heat release amount of each, the cooling performance of each heat exchanger can be maintained.

(2) According to the present invention, the fuel cooler and the condenser are arranged at the downstream side in the flow direction of the cooling air than a front surface of the intercooler with reference to the front surface of the intercooler.

With this arrangement, without increasing the space in a case of installing the radiator, the oil cooler, the intercooler and the condenser, it is possible to add the fuel cooler to the same space for arrangement.

(3) According to the present invention, a dust protective net for trapping dusts in the cooling air is provided at a front surface side of the intercooler, the condenser and the fuel cooler.

With this arrangement, when the outside air is sucked in by the cooling fan, the dust protective net can trap dusts, insects and the like in the outside air. Therefore, one dust protective net can restrict dusts and the like to be accumulated in the plural heat exchangers, reducing the number of times of cleaning these heat exchangers. The dust protective net provided on the most upstream position can easily clean the trapped dusts, insects and the like.

(4) The present invention comprises an inlet side air hose connecting a supercharger of the engine and an inlet opening of the intercooler, and an outlet side air hose connecting an outlet opening of the intercooler and an intake side of the engine, wherein the each air hose adopts a molded hose formed in advance in a predetermined shape by bend molding and is arranged between the engine and the intercooler to ride over an top surface of each of the radiator and the oil cooler.

With this arrangement, the air hose at the inlet side and the air hose at the outlet side can be easily mounted and removed to and from the engine and the intercooler, improving an assembly operational efficiency, a maintenance operational efficiency and the like.

Since the air hose at the inlet side and the air hose at the outlet side connect the engine and the intercooler to ride over the top surface of the radiator and the oil cooler, each air hose can be easily moved in a state where each air hose is removed from the intercooler. Therefore, the radiator and the oil cooler can be pulled upwards independently for removal, easily performing the cleaning operation, the repair operation and the like of the radiator and the oil cooler.

(5) According to the present invention, the heat exchanger unit comprises a support body of a frame structure mounted on the vehicle body, and the radiator, the oil cooler, the intercooler, the condenser and the fuel cooler are accommodated in the support body.

With this arrangement, since the support body of the frame structure can guide the cooling air flown in from the outside toward the cooling fan, the fluid to be cooled by the radiator, the oil cooler, the intercooler, the condenser and the fuel cooler can be efficiently cooled.

(6) According to the present invention, the vehicle body comprises an automotive lower traveling structure and an upper revolving structure swingably mounted on the lower traveling structure, and the cab, the engine, the hydraulic pump, the cooling fan and the heat exchanger unit are provided on a revolving frame serving as a support structural body of the upper revolving structure.

MODE OF CARRYING OUT THE INVENTION

Hereinafter, as a representative example of a construction machine in an embodiment according to the present invention, a detailed description will be given of a hydraulic excavator equipped with a radiator, an oil cooler, an intercooler, a condenser of an air conditioner and a fuel cooler with reference to FIG. 1 to FIG. 9.

Figure 1:
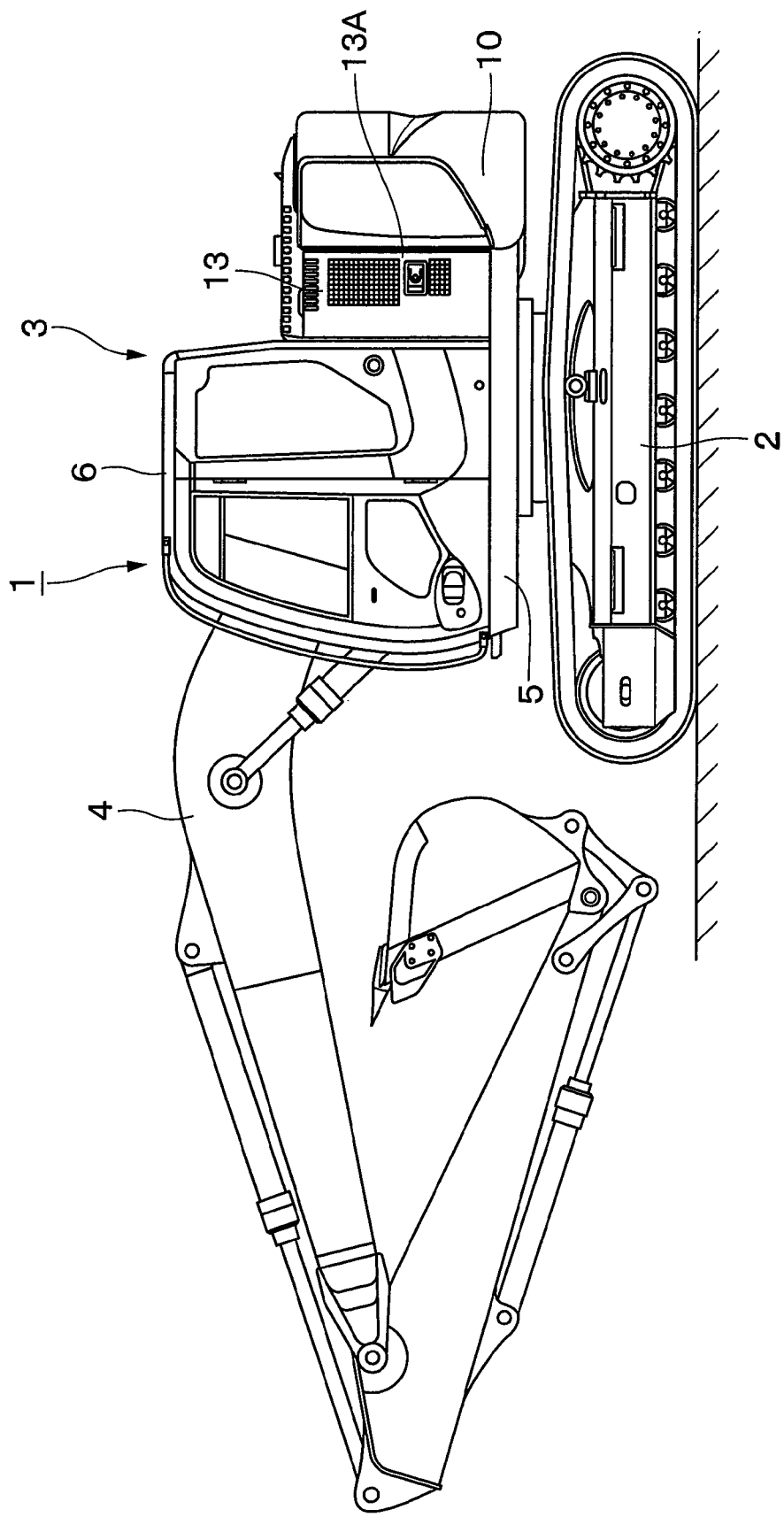
FIG. 1 is a front view showing a hydraulic excavator according to an embodiment of the present invention.

In FIG. 1, denoted at 1 is a crawler type hydraulic excavator as a construction machine. The hydraulic excavator 1 is largely constituted by an automotive lower traveling structure 2, an upper revolving structure 3 swingably mounted on the lower traveling structure 2 and a working mechanism 4 liftably provided at a front side of the upper revolving structure 3 in front and rear directions to perform a ground excavating operation of earth and sand. The lower traveling structure 2 and the upper revolving structure 3 constitute a vehicle body in the present invention. Here, the hydraulic excavator 1 is constituted such that the upper revolving structure 3 is formed as a small revolving machine accommodated substantially within the vehicle width of the lower traveling structure 2. In this case, as shown in FIG. 2, the upper revolving structure 3 is formed of a substantially circular shape such that at least a rear side thereof is accommodated substantially within the vehicle width of the lower traveling structure 2 and is formed in a very compact size as a whole.

First, a revolving frame 5, a cab 6, an engine 7, a hydraulic pump 8, a cooling fan 9 and the like constituting the upper revolving structure 3 will be explained with reference to FIG. 1 to FIG. 4.

Figure 3:
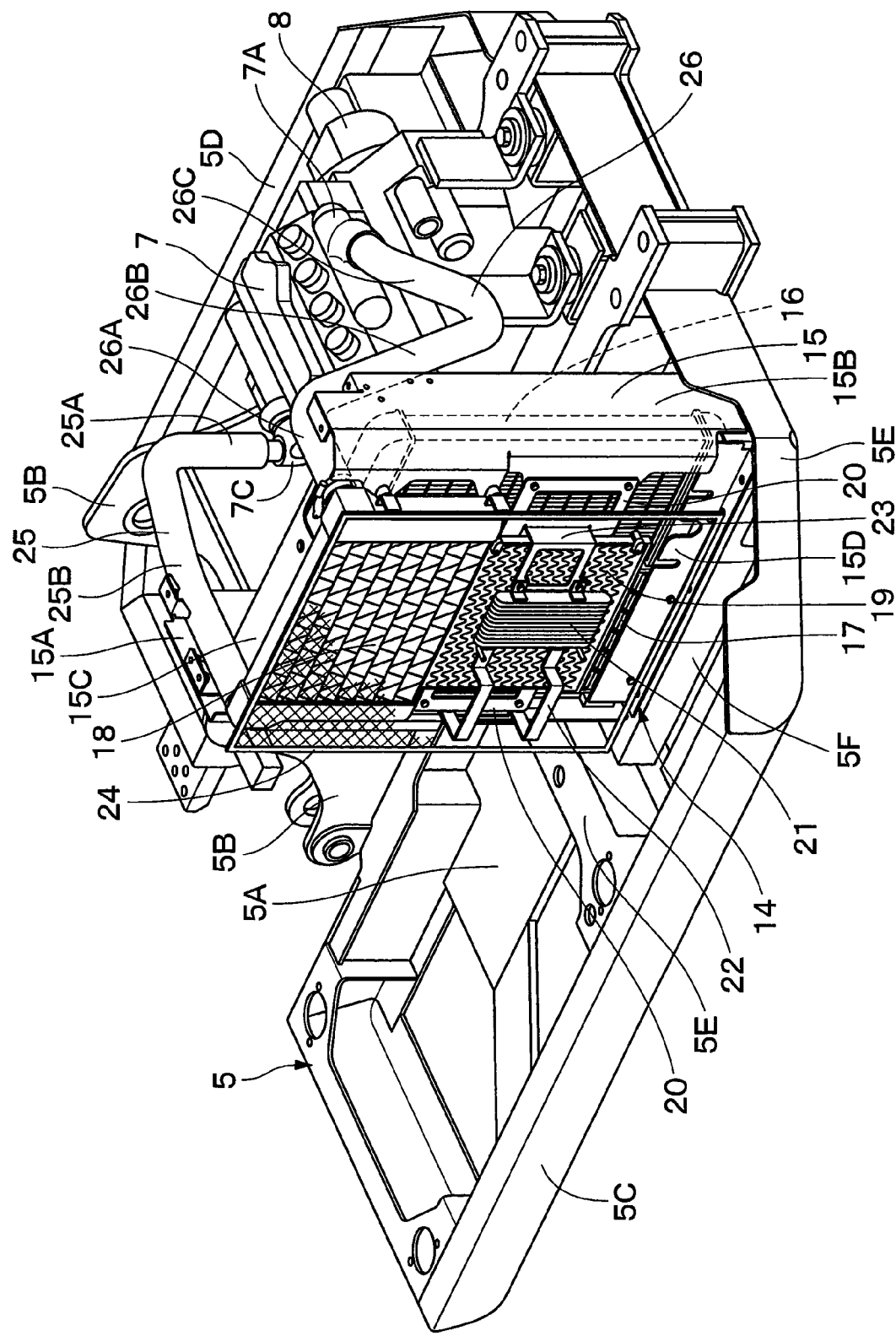
FIG. 3 is an external perspective view showing a revolving frame, an engine, a heat exchanger unit, an air hose and the like with an exterior housing cover and a counterweight removed, as viewed from an inclined rear side of an upper revolving structure.
Figure 4:
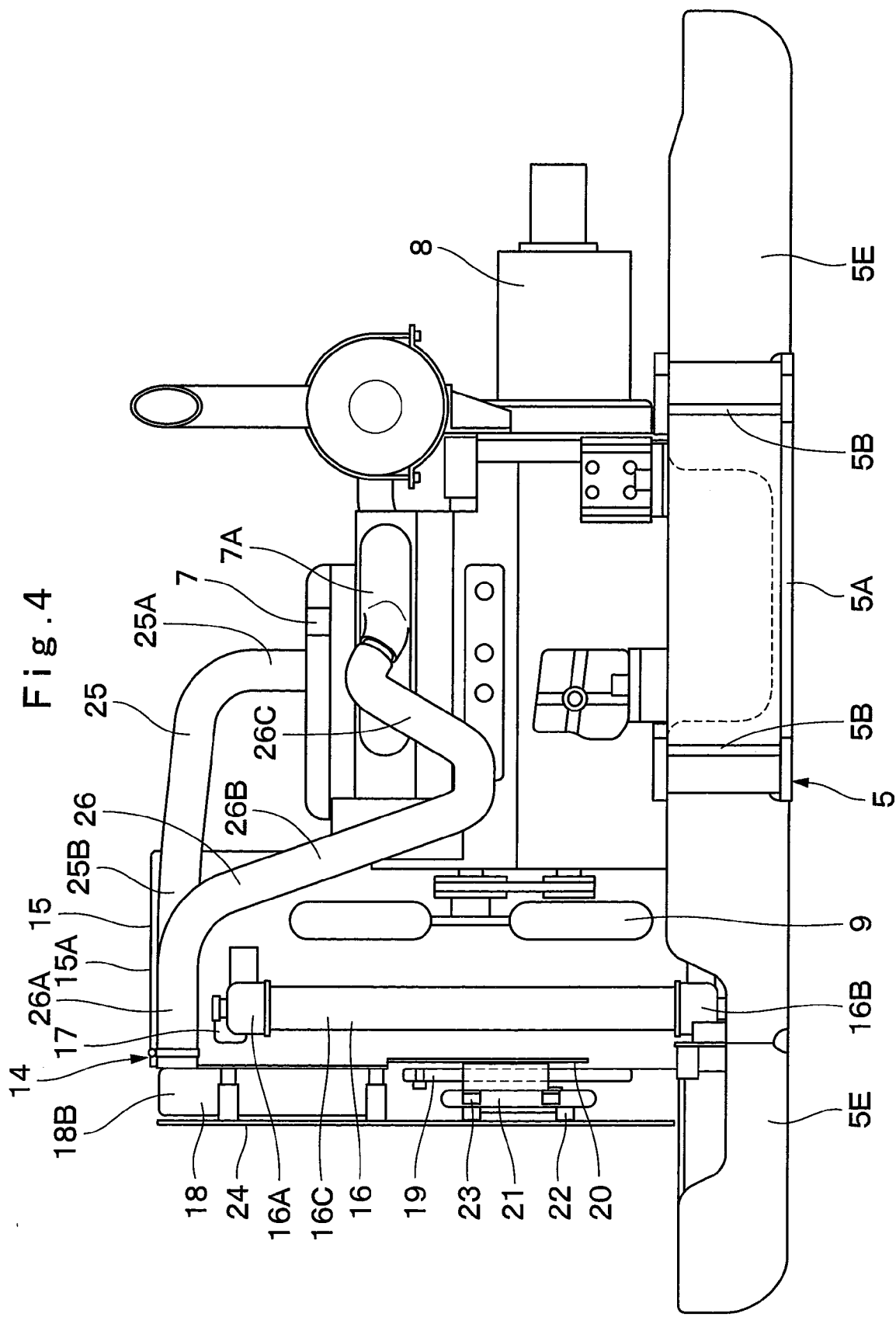
FIG. 4 is a right side view in FIG. 2 showing a revolving frame, an engine, a heat exchanger unit, an air hose and the like with an exterior housing cover and a counterweight removed, as viewed from a rear side of an upper revolving structure.

Denoted at 5 is a revolving frame serving as a support structural body of the upper revolving structure 3. As shown in FIG. 3 and FIG. 4, the revolving frame 5 is largely constituted by a bottom plate 5A formed of a thick steel plate or the like and extending in the front and rear directions for constituting a major part of the revolving frame 5, left and right vertical plates 5B mounted on the bottom plate 5A and extending in the front and rear directions with a predetermined intervals in the left and right directions, a left side frame 5C and a right side frame 5D respectively located in the left and right sides of the left vertical plate 5B with an interval therebetween and extending in the front and rear directions, a plurality of extension beams 5E extending in the left and right directions from the bottom plate 5A and the vertical plate 5B and supporting the left and right side frames 5C and 5D at its fore end portions and a support beam 5F positioned in the left rear side and provided between the extension beams 5E adjacent to each other in the front and rear directions. The working mechanism 4 is liftably mounted at the front side of each vertical plate 5B, and the heat exchanger unit 14 is mounted in the support beam 5F, which will be described hereinafter.

Figure 2:
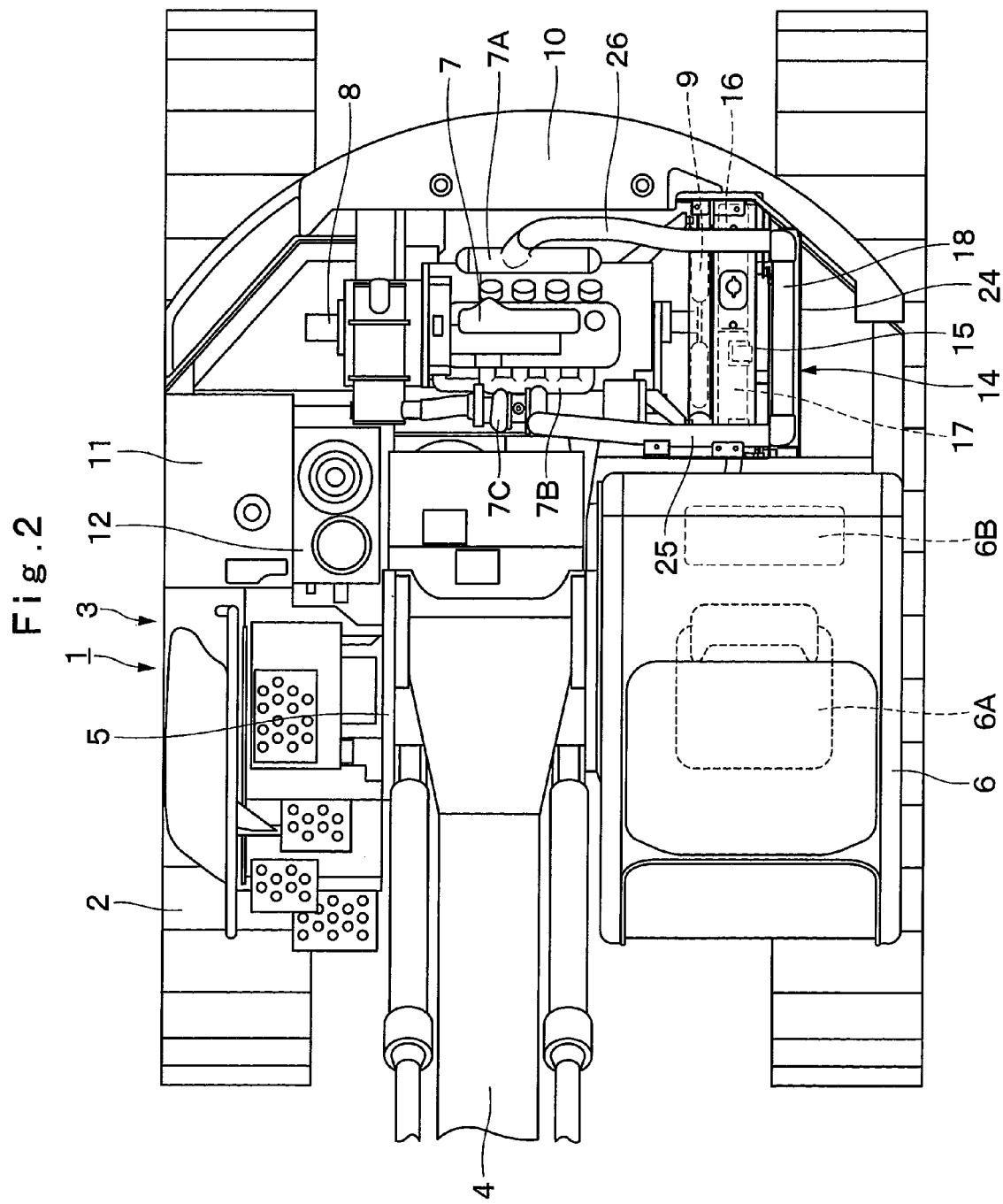
FIG. 2 is an enlarged plan view showing a lower traveling structure, an upper revolving structure and the like with an exterior housing cover removed.

Denoted at 6 is a cab mounted on the left front side of the revolving frame 5 (see FIG. 1 and FIG. 2). The cab 6 is where an operator gets on and is provided with an operator's seat 6A in which the operator is to be seated, an indoor machine 6B of an air conditioner, a control lever for traveling, a control lever for working (both not shown) and the like, located therein. Here, the indoor machine 6B supplies conditioned air such as cooled air and warmed air into the cab 6 and constitutes the air conditioner together with a condenser 19 as an outdoor machine, which will be described hereinafter.

Denoted at 7 is the engine mounted at the rear side of the revolving frame 5. The engine 7 is located in a transversely mounted state extending in the left and right directions and is provided with an intake manifold 7A for distributing aspired air to each cylinder (not shown) and an exhaust manifold 7B for discharging exhaust gases from the respective cylinders all together. A supercharger (turbocharger) 7C for increasing a flow amount of intake air is provided at the outlet side of the exhaust manifold 7B.

Denoted at 8 is the hydraulic pump provided at the right side of the engine 7. The hydraulic pump 8 is driven by the engine 7 to pressurize and discharge operating oil supplied from a below-described operating oil tank 12. The operating oil which drives various types of actuators and is returned is cooled by a below-described oil cooler 17 and is returned to the operating oil tank 12.

Denoted at 9 is the cooling fan provided at the left side of the engine 7. The cooling fan 9 is driven and rotated by the engine 7 as a power source to suck outside air as the cooling air in an exterior housing cover 13 and supplies the outside air to the radiator 16, the oil cooler 17, the intercooler 18, the condenser 19 and a fuel cooler 21, which will be described hereinafter.

Figure 7:
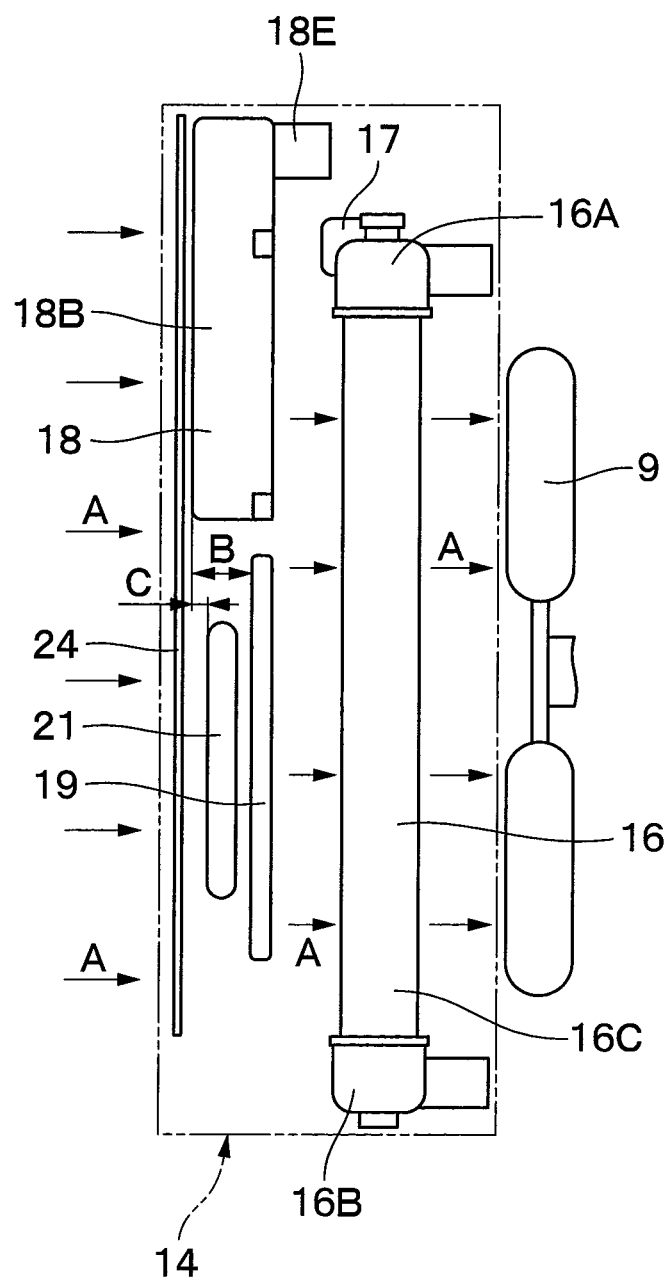
FIG. 7 is an arrangement explanation diagram showing an arrangement relation of a radiator, an oil cooler, an intercooler, a condenser, a fuel cooler and a dust protective net taken from a similar position to that of FIG. 4.

Here, the flow direction of the cooling air generated by the cooling fan 9 is an arrow A direction shown in FIG. 7, and the cooling air flows from the upstream side as the left side in the left and right directions of the upper revolving structure 3 toward the cooling fan 9 positioned at the right side (downstream side). Therefore, the front surface side of the cooling fan 9 is the upstream side in the flow direction A of the cooling air. A heat exchanger unit 14 to be described later is disposed at the front surface side of the cooling fan 9 so as to oppose each other.

Indicated at 10 is a counterweight mounted on a rear end portion of the revolving frame 5. The counterweight 10 acts as a weight balance to the working mechanism 4 and is formed as a heavy load in an arc shape. The counterweight 10 in the present embodiment is arranged in a position in close proximity to a revolving center such that the rear side of the upper revolving structure 3 is accommodated substantially within the vehicle width of the lower traveling structure 2 even at revolving. Therefore, a space at the front surface side of the cooling fan 9 (left side as the entire upper revolving structure 3) where the heat exchanger unit 14 is disposed is narrow.

Indicated at 11 is the fuel tank positioned at a front side of the hydraulic pump 8 and mounted at the right side of the revolving frame 5. The fuel tank 11 reserves fuel supplied to the engine 7 and is connected through the below-described fuel cooler 21 to the engine 7.

Indicated at 12 is the operating oil tank positioned adjacent left to the fuel tank 11 and mounted on the revolving frame 5. The operating oil tank 12 reserves operating oil supplied from the hydraulic pump 8 to various types of actuators. The operating oil tank 12 has a supply side connected to the hydraulic pump 8 and a return side to the below-described oil cooler 17.

Indicated at 13 is the exterior housing cover provided on the revolving frame 5 at a front side of the counterweight 10. The exterior housing cover 13 covers the engine 7, the hydraulic pump 8, the below-described heat exchanger unit 14 and the like. When the cooling fan 9 is driven and rotated, the exterior housing cover 13 makes outside air as the cooling air flow in from a left side door 13A positioned at the left side (upstream side) and makes the cooling air warmed due to the cooling of each unit, flow out from a right side door (not shown) positioned at the right side (downstream side) to an outside.

Next, the heat exchanger unit 14 according to the present embodiment for cooling the engine cooling water, the operating oil, the intake air, the coolant and the fuel by the cooling air will be explained with reference to FIG. 3 to FIG. 9.

Figure 5:
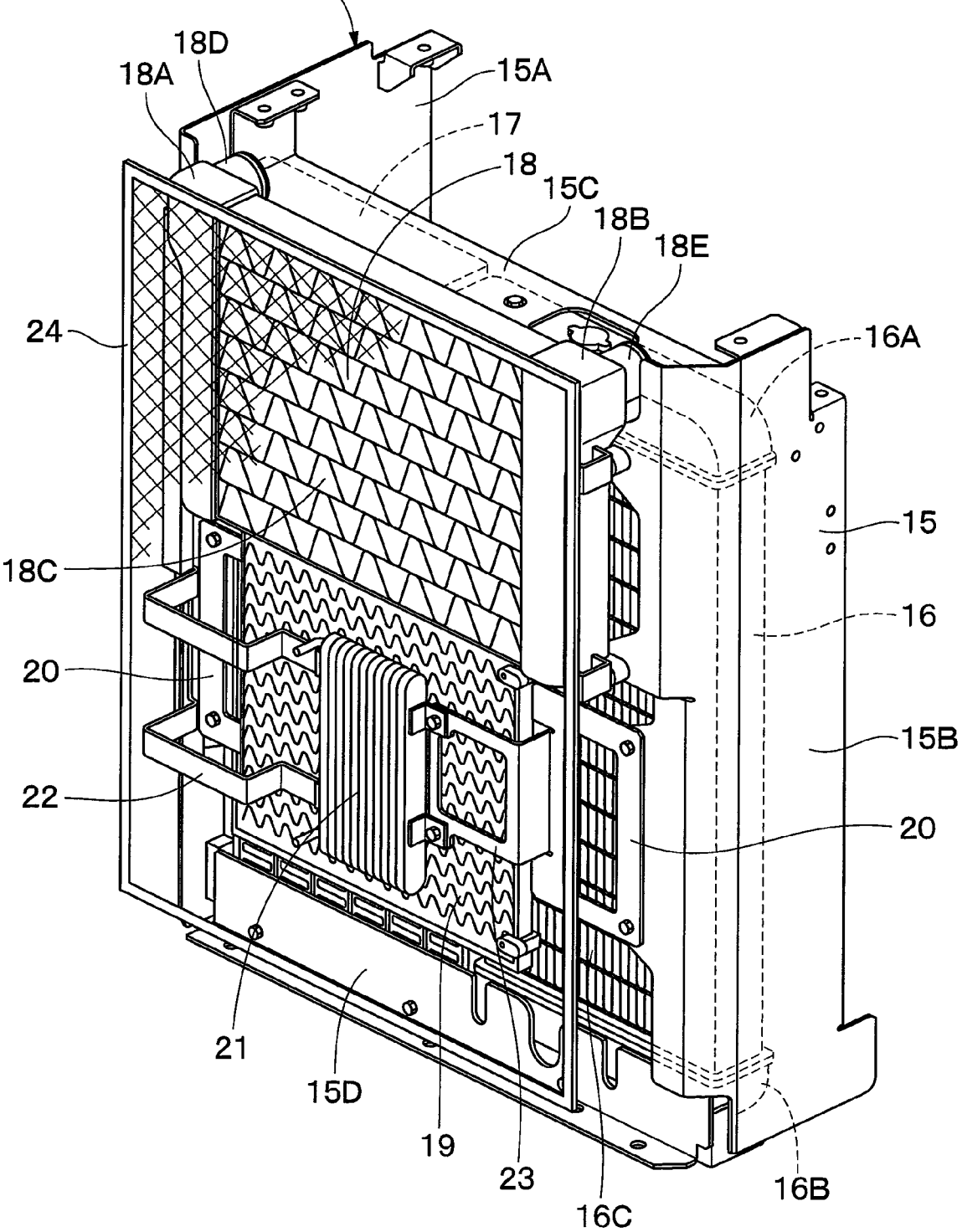
FIG. 5 is an enlarged external perspective view showing the heat exchanger unit in FIG. 3 as a single unit.
Figure 6:
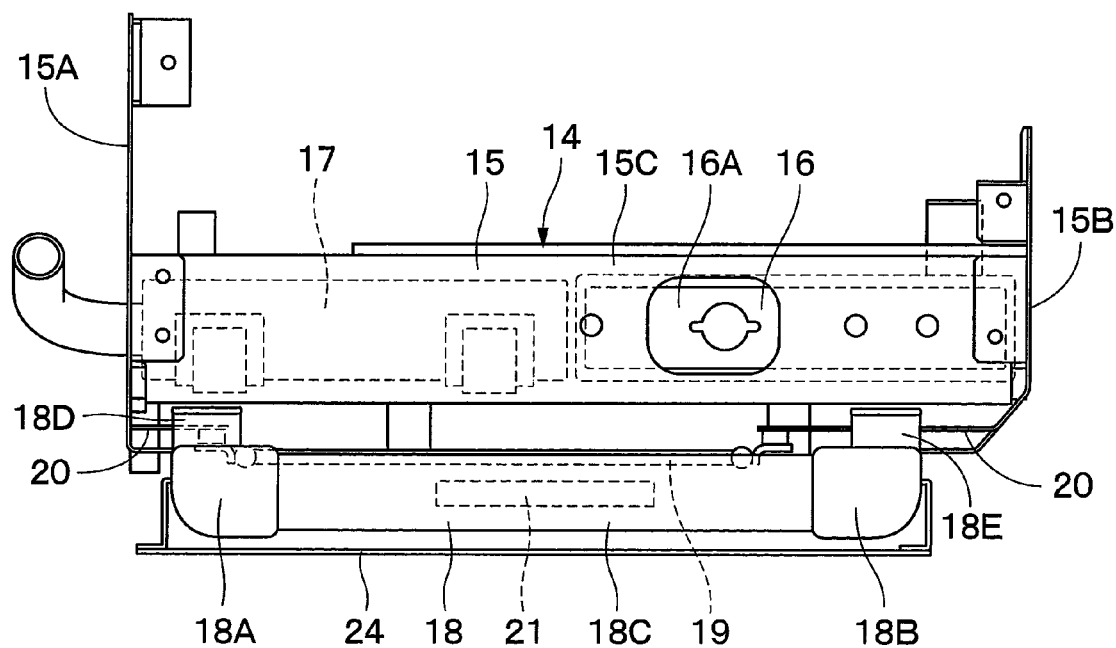
FIG. 6 is a plan view showing the heat exchanger unit shown in FIG. 5.

In FIG. 3 and FIG. 4, designated at 14 is the heat exchanger unit positioned at the left side of the cooling fan 9 and provided at the rear side of the revolving frame 5. The heat exchanger unit 14 cools various fluids increased in temperature by the cooling air generated by the cooling fan 9. As shown in FIG. 5 and FIG. 6, the heat exchanger unit 14 is largely constituted by a support body 15, the radiator 16, the oil cooler 17, the intercooler 18, the condenser 19, the fuel cooler 21, a dust protective net 24 and the like, which will be described hereinafter.

Denoted at 15 is the support body serving as an outer frame of the heat exchanger unit 14. The support body 15 is formed as a frame structure for surrounding and supporting the radiator 16, the oil cooler 17, the intercooler 18, the condenser 19, and the fuel cooler 21. The support body 15 cooperates with the exterior housing cover 13 to guide cooling air flown in from an outside toward the cooling fan 9.

The support body 15 is largely constituted by a front side plate 15A arranged at the back side of the cab 6, a rear side plate 15B opposing the front side plate 15A by a predetermined distance and arranged at the side of the counterweight 10, an upper side connecting plate 15C connecting the front side plate 15A and the rear side plate 15B at the upper side, and a lower side connecting plate 15D connecting the front side plate 15A and the rear side plate 15B at the lower side. In the support body 15, for example, the front side plate 15A and the rear side plate 15B are bolted to the lower portions to the extension beam 5E of the revolving frame 5, and the lower side connecting plate 15D is bolted to the support beam 5F.

It should be noted that the upper side connecting plate 15C is arranged to cover an upper side of the radiator 16 and the oil cooler 17, which will be described hereinafter. However, since the upper side connecting plate 15C is detachably mounted to each of the side plates 15A and 15B, the upper side connecting plate 15C can be easily removed when the radiator 16 and the oil cooler 17 are pulled out to the upper side.

Next, among the heat exchanger unit 14, the radiator 16 and the oil cooler 17 arranged to oppose the front side of the cooling fan 9 will be explained. The radiator 16 and the oil cooler 17 are arranged at the most downstream side in the flow direction (arrow A direction in FIG. 7) of the cooling air by the cooling fan 9. That is, the radiator 16 and the oil cooler 17 constitute a third heat exchanger positioned at the most downstream side in the flow direction A of the cooling air among the heat exchanger unit 14 arranged in a three-layered structure.

Denoted at 16 is the radiator positioned at the front side of the counterweight 10 and provided to oppose the cooling fan 9. The radiator 16 is arranged extending in the front and rear directions so as to be perpendicular to the cooling air flowing in a lateral direction from the left side door 13A to the right side door within the exterior housing cover 13. The radiator 16 is arranged closer to the rear side between the front side plate 15A and the rear side plate 15B in the support body 15. In consequence, the radiator 16 is arranged at the upstream side of the flow direction A of the cooling air by the cooling fan 9 together with the oil cooler 17 to be described later, that is, in parallel in the flow direction A of the cooling air at the front surface side of the cooling fan 9.

On the other hand, the radiator 16 cools engine cooling water increased in temperature due to the cooling of the engine 7. Accordingly, the radiator 16 is required to cool a great deal of engine cooling water and the heat release amount is a value larger than each value of the intercooler 18 and the condenser 19, which will be described hereinafter. The radiator 16 has a large thickness dimension in such a manner as to be capable of increasing a heat release area corresponding to treatment capabilities.

On the other hand, the radiator 16 is largely constituted by an upper tank 16A, a lower tank 16B and a heat release portion 16C, and each of the tanks 16A and 16B is connected to a water jacket of the engine 7. In the radiator 16, the upper tank 16A is bolted to the upper side connecting plate 15C of the support body 15 and the lower tank 16B is bolted to the lower side connecting plate 15D. The radiator 16 can be pulled out to the upper side by loosening the bolts mounted on the support body 15 and removing the upper side connecting plate 15C, and in this state, cleaning operations of the adhered dusts or the like and repair operations can be performed.

Denoted at 17 is the oil cooler positioned at the front side of the radiator 16 (rear side of the cab 6) and provided to oppose the cooling fan 9. The oil cooler 17 is arranged in parallel in the flow direction A of the cooling air together with the radiator 16. In this case, the radiator 16 and the oil cooler 17 are arranged in substantially the same plane with a surface perpendicular to the flow direction A of the cooling air. Here, the oil cooler 17 cools operating oil of which the temperature is increased to be returned to the operating oil tank 12. Therefore, the oil cooler 17 is required to cool a great deal of the operating oil increased in temperature and the heat release amount is a value larger than each value of the intercooler 18 and the condenser 19, which will be described hereinafter. Therefore, the oil cooler 17 has a large thickness dimension in such a manner as to be capable of increasing a heat release area substantially similarly to the radiator 16.

On the other hand, the oil cooler 17 is largely constituted by an upper tank, a lower tank and a heat release portion substantially similarly to the radiator 16, and each of the tanks is connected to an operating oil pipe of an inlet side and an operating oil pipe of an outlet side (both are not shown). In the oil cooler 17, the upper tank is bolted to the upper side connecting plate 15C of the support body 15 and the lower tank is bolted to the lower side connecting plate 15D. Therefore, the oil cooler 17 can be pulled out to the upper side to perform cleaning operations or and repair operations substantially similarly to the radiator 16.

Next, among the heat exchanger unit 14, the intercooler 18 and the condenser 19 arranged to oppose the front surface side which is the upstream side than the radiator 16 and the oil cooler 17 in the flow direction A due to the cooling air by the cooling fan 9 will be explained. The intercooler 18 and the condenser 19 constitute a secondary heat exchanger at the intermediate position in the flow direction A of the cooling air among the heat exchanger unit 14 arranged in a three-layered structure.

That is, denoted at 18 is the intercooler provided at the left side of the radiator 16 and the oil cooler 17 (side of the left side door 13A). The intercooler 18 cools intake air flowing in from the supercharger 7C of the engine 7 and makes the cooled intake air flow out to the intake manifold 7A. Accordingly, the intercooler 18 is required to cool the expanded high-temperature intake air for contraction, and the heat release amount is a value larger than each value of the condenser 19 and the fuel cooler 21, which will be described hereinafter. Therefore, the intercooler 18 has a large thickness dimension in the flow direction of the cooling air in such a manner as to be capable of increasing a heat release area, and for example, is formed having the thickness dimension larger than a combined thickness dimension of the condenser 19 and the fuel cooler 21.

Here, the intercooler 18 is mounted at the upper side between the front side plate 15A and the rear side plate 15B. On the other hand, the intercooler 18 is positioned at the front surface side of the radiator 16 and the oil cooler 17 which is the upstream side than the radiator 16 and the oil cooler 17 in the flow direction A of the cooling air and is arranged in parallel with the condenser 19 and the fuel cooler 21, which will be described hereinafter, in the flow direction A of the cooling air. In this case, the intercooler 18 is arranged in a position above from the intermediate position in the height direction of the radiator 16 and the oil cooler 17.

The intercooler 18 is largely constituted by a front tank 18A positioned at the front side (side of the cab 6), a rear tank 18B positioned at the rear side (side of the counterweight 10), and a heat release portion 18C extending in the front and rear directions between the respective tanks 18A and 18B. The intercooler 18 projects over the top surface of the radiator 16 and the oil cooler 17, for example, over the upper side connecting plate 15C of the support body 15 covering the top surface of the oil cooler 17. A hose connecting pipe 18D at the inlet side function as the inlet opening is provided to project in a lateral direction toward the upper side of the upper side connecting plate 15C at the upper portion of the front tank 18A. A hose connecting pipe 18E at the outlet side function as the outlet opening is provided to project in a lateral direction toward the upper side of the upper side connecting plate 15C at the upper portion of the rear tank 18B.

In the intercooler 18, the hose connecting pipe 18D at the inlet side is connected through an inlet side air hose 25 to be described later to the supercharger 7C of the engine 7. On the other hand, the hose connecting pipe 18E at the outlet side is connected through an outlet side air hose 26 to be described later to the intake manifold 7A of the engine 7.

Denoted at 19 are the condensers constituting the outdoor machine as a part of the air conditioner. The condensers 19 are lined up under the intercooler 18. The condenser 19 is connected to the indoor machine 6B in the cab 6 and releases (cool) heat of the evaporated coolant supplied from the indoor machine 6B to return the coolant to a liquid. Accordingly, since the condenser 19 in the air conditioner has the heat release amount as many as to be capable of converting the coolant into the liquid, a thickness dimension in the flow direction A of the cooling air is, for example, less than a half of the thickness dimension of the above-mentioned intercooler 18.

The condenser 19 is mounted in a lower side position of a left end portion of the front side plate 15A and the rear side plate 15B of the support body 15 through a bracket 20. On the other hand, the condenser 19 is positioned at a front surface side of the radiator 16 and the oil cooler 17 which is the upstream side than the radiator 16 and the oil cooler 17 in the flow direction A of the cooling air and is parallel with the intercooler 18 in the flow direction A of the cooling air. Namely, the condenser 19 is arranged in a position under the intermediate position in the height direction of the radiator 16 and the oil cooler 17.

In regard to the front surface of the condenser 19, as shown in FIG. 7, the condenser 19 is arranged in a position deeper by a length dimension B from the front surface of the intercooler 18 with reference to the front surface of the intercooler 18, that is, at the downstream side in the flow direction A of the cooling air with reference to the front surface of the intercooler 18. On the other hand, in regard to the rear surface of the condenser 19, the condenser 19 is arranged such that its rear surface being positioned in substantially the same surface as the rear surface of the intercooler 18. Therefore, the fuel cooler 21 to be described later can be arranged at the front surface side of the condenser 19 so as not to be projected to the front side from the intercooler 18.

Next, among the heat exchanger unit 14, the fuel cooler 21 arranged to oppose the front surface side of the condenser 19 which is the upstream side than the condenser 19 in the flow direction A of the cooling air by the cooling fan 9 will be explained. The fuel cooler 21 constitutes a primary heat exchanger positioned at the most upstream side in the flow direction A of the cooling air among the heat exchanger unit 14 arranged in a three-layered structure.

Denoted at 21 is the fuel cooler provided under the intercooler 18. The fuel cooler 21 cools fuel supplied to the engine 7 for stabilizing a mixture ratio of the fuel supplied to the engine 7 such that the combustion efficiency of the engine 7 can be improved to reduce an emission amount of the carbon dioxide. Accordingly, since the fuel cooler 21 is not required to cool a great deal of or high-temperature liquids, the heat release amount is small. Therefore, the fuel cooler 21 has an outside dimension smaller than the condenser 19 and a thickness dimension less than a half of the thickness dimension of the intercooler 18, for example.

Here, the fuel cooler 21 is arranged at the front surface side of the condenser 19 which is the upstream side than the condenser 19 in the flow direction A of the cooling air and under the intercooler 18. The fuel cooler 21 is mounted in a lower side position of the left end portion of the front side plate 15A and the rear side plate 15B in the support body 15 through the brackets 22 and 23. In this case, as shown in FIG. 7, the fuel cooler 21 is arranged in a position deeper by a length dimension C from the front surface of the intercooler 18 with reference to the front surface of the intercooler 18, that is, at the downstream side in the flow direction A of the cooling air with reference to the front surface of the intercooler 18. Therefore, the fuel cooler 21 can be arranged not to project over the front side of the intercooler 18 but to be easily arranged in the existing installment space.

The reason for being capable of thus arranging the fuel cooler 21 is that each thickness dimension of the condenser 19 and the fuel cooler 21 is thinner than the thickness dimension of the intercooler 18 and the condenser 19 is arranged closer to the rear side in such a manner as to be positioned in substantially the same surface as the rear surface of the intercooler 18.

Denoted at 24 is the dust protective net provided at the front surface side of the intercooler 18, the condenser 19 and the fuel cooler 21. The dust protective net 24 traps dusts, insects and the like in the cooling air aspired by the cooling fan 9 and is detachably mounted in the bracket 20 or the like. As shown in FIG. 5 and the like, the dust protective net 24 is formed in a rectangular shape as large as to be capable of covering the front surface of the radiator 16, the oil cooler 17, the intercooler 18, the condenser 19 and the fuel cooler 21 with one sheet. The dust protective net 24 is provided at the side of the left side door 13A of the exterior housing cover 13, and therefore the trapped dust, insect and the like can be easily cleaned.

As described before, in the heat exchanger unit 14, the radiator 16 and the oil cooler 17, each having a large heat release amount, are arranged at the front surface side of the cooling fan 9 which is the downstream side in the flow direction A of the cooling air and the intercooler 18 and the condenser 19, each having a heat release amount smaller than each of the radiator 16 and the oil cooler 17, are arranged at the front surface side of the radiator 16 and the oil cooler 17. The fuel cooler 21 having the smallest heat release amount is arranged at the front side of the condenser 19.

In consequence, since the intercooler 18, the fuel cooler 21, the condenser 19, the radiator 16, and the oil cooler 17 can be arranged in the order such that the heat release amount thereof sequentially increases from the upstream side to the downstream side in the flow direction A of the cooling air, even the radiator 16 and the oil cooler 17 positioned at the downstream side in the flow direction A of the cooling air can efficiently release heat of the liquid to be cooled. The condenser 19 and the fuel cooler 21 respectively are formed to have a thickness dimension smaller than the intercooler 18, and the fuel cooler 21 is formed in a smaller size than the condenser 19. Accordingly, the condenser 19 and the fuel cooler 21 can be accommodated within a range of the thickness dimension of the intercooler 18 with good heat releasing efficiency.

Figure 8:
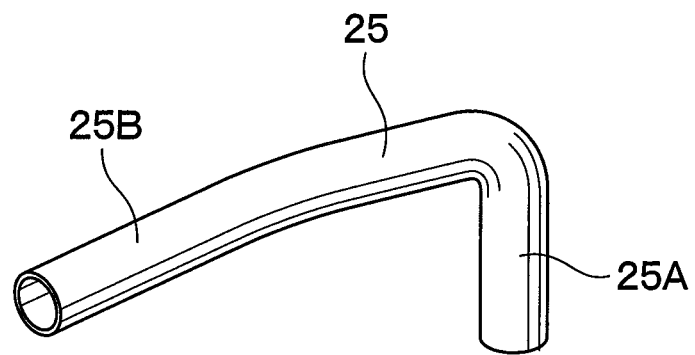
FIG. 8 is an enlarged perspective view showing an inlet side air hose as a single unit.

Denoted at 25 is the inlet side air hose provided to connect the engine 7 and the intercooler 18 and make intake air flow in toward the intercooler 18. As shown in FIG. 8, the inlet side air hose 25 is formed in a substantially L-shape by an upstream side vertical hose portion 25A and a downstream side horizontal hose portion 25B which is bent substantially at right angles from an upper portion of the vertical hose portion 25A and extended. In the inlet side air hose 25, as shown in FIG. 3, an end portion of the upstream side vertical hose portion 25A is connected to the supercharger 7C of the engine 7 and an end portion of the downstream side horizontal hose portion 25B is connected to the hose connecting pipe 18D at the inlet side of the intercooler 18. Thereby, the inlet side air hose 25 supplies intake air increased in temperature through the supercharger 7C to the intercooler 18.

Here, a molded hose in advance molded bent in a substantially L-shape formed of the vertical hose portion 25A and the horizontal hose portion 25B is used as the inlet side air hose 25. Namely, the inlet side air hose 25 is formed of, for example, a resin material and the like having a heat resistance and flexibility. Accordingly, the inlet side air hose 25 can be easily mounted or removed to or from the supercharger 7C of the engine 7 and the hose connecting pipe 18D in the intercooler 18.

On the other hand, the inlet side air hose 25 is arranged above the top surface of the oil cooler 17, namely, between the engine 7 and the intercooler 18 riding over the upper side connecting plate 15C of the support body 15. In this way, since the inlet side air hose 25 is arranged above the oil cooler 17, the inlet side air hose 25 can easily remove the horizontal hose portion 25B from the hose connecting pipe 18D at the inlet side of the intercooler 18. The removed inlet side air hose 25 can be easily moved to retreat from the upward side of the oil cooler 17.

Figure 9:
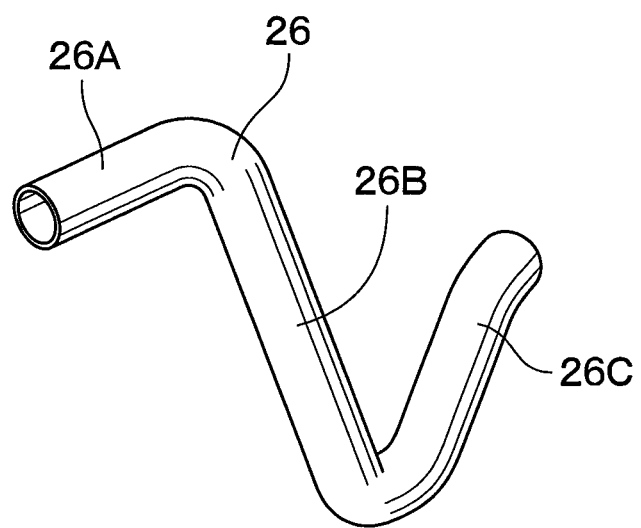
FIG. 9 is an enlarged perspective view showing an outlet side air hose as a single unit.

Denoted at 26 is the outlet side air hose provided to connect the engine 7 and the intercooler 18 and make intake air flow out from the intercooler 18. As shown in FIG. 9, the outlet side air hose 26 is formed in a substantially S-shape by an upstream side horizontal hose portion 26A, an intermediate rising-down hose portion 26B which is bent downwards from an end portion of the horizontal hose portion 26A and extended and a downstream side rising-up hose portion 26C which is bent upwards from an lower end portion of the rising-down hose portion 26B. In the outlet side air hose 26, as shown in FIG. 3 and FIG. 4, an end portion of the upstream side horizontal hose portion 26A is connected to the hose connecting pipe 18E at the outlet side of the intercooler 18 and an end portion of the downstream side rising-up hose portion 26C is connected to the intake manifold 7A of the engine 7. Thereby, the outlet side air hose 26 supplies intake air cooled by flowing through the intercooler 18, to the engine 7.

Here, a molded hose in advance molded bent in a substantially S-shape formed of the horizontal hose portion 26A, the rising-down hose portion 26B and the rising-up hose portion 260 is used in the outlet side air hose 26 substantially similarly to the inlet side air hose 25. Namely, the outlet side air hose 26 is formed of, for example, a resin material and the like having a heat resistance and flexibility. Accordingly, the outlet side air hose 26 can be easily mounted or removed to or from the hose connecting pipe 18E in the intercooler 18 and the intake manifold 7A in the engine 7.

On the other hand, the outlet side air hose 26 is arranged above the top surface of the radiator 16, namely, between the intercooler 18 and the engine 7 riding over the upper side connecting plate 15C of the support body 15. In this way, since the outlet side air hose 26 is arranged above the radiator 16, the outlet side air hose 26 can easily remove the horizontal hose portion 26A from the hose connecting pipe 18E at the outlet side of the intercooler 18. The removed outlet side air hose 26 can be easily moved to retreat from the upward side of the radiator 16.

The hydraulic excavator 1 according to the present embodiment is constituted as described above, and next, operations in a case of performing the cleaning operation, the repair operation and the like of the radiator 16 and the oil cooler 17 will be explained.

First, in a case of removing the radiator 16 and the oil cooler 17 as a single unit, since the radiator 16 and the oil cooler 17 are removed by pulling them out upwards, the upper side connecting plate 15C of the support body 15 positioned at the upper side, the inlet side air hose 25 and the outlet side air hose 26 cause obstruction.

Therefore, the horizontal hose portion 25B of the inlet side air hose 25 is removed from the hose connecting pipe 18D at the inlet side of the intercooler 18 and the horizontal hose portion 26A of the outlet side air hose 26 is removed from the hose connecting pipe 18E at the outlet side of the intercooler 18. At this time, since the respective air hoses 25 and 26 are arranged at a position where no obstacle exists riding over the upper side connecting plate 15C of the support body 15, they can be easily removed. The removed air hoses 25 and 26 can be easily moved to retreat from the upward side of the upper side connecting plate 15C of the support body 15.

When the respective air hoses 25 and 26 are retreated from the upward side of the upper side connecting plate 15C of the support body 15, the radiator 16 and the oil cooler 17 can be pulled out to the upper side as a single unit by removing the upper side connecting plate 15C. In consequence, it is possible to perform the cleaning operation, the repair operation and the like of the radiator 16 and the oil cooler 17.

On the other hand, when the cleaning operation, the repair operation and the like of the radiator 16 and the oil cooler 17 are completed, the radiator 16 and the oil cooler 17 are put into the support body 15 from above and the upper side connecting plate 15C is mounted. Thereafter, the horizontal hose portion 25B of the inlet side air hose 25 is connected to the hose connecting pipe 18D at the inlet side of the intercooler 18, and the horizontal hose portion 26A of the outlet side air hose 26 is connected to the hose connecting pipe 18E at the outlet side of the intercooler 18. At this time, each of the air hoses 25 and 26 composed of a flexible molded hose in advance molded in a predetermined shape can be easily connected to the hose connecting pipes 18D and 18E of the intercooler 18 without being forcibly bent.

Next, a ground excavating operation of the hydraulic excavator 1 will be explained. An operator gets on the cab 6 and is seated on the operator's seat 6A. When the control lever for traveling is operated at this state, the lower traveling structure 2 can be driven to advance or retreat the hydraulic excavator 1. When the operator seated on the operator's seat 6A operates the control lever for working, the operator can lift up or lower down the working mechanism 4 to perform a ground excavating operation of earth, sand, and the like.

On the other hand, the cab 6 in the hydraulic excavator 1 accommodates the indoor machine 6B in the air conditioner therein, which is connected to the condenser 19 as the outdoor machine. The operator operates the air conditioner at the time of working to supply the conditioned air adjusted in temperature by the indoor machine 6B inside the cab 6, thereby making it possible for the operator to perform a working operation under a comfortable environment.

At the time of working the hydraulic excavator 1, outside air is aspired into the exterior housing cover 13 as the cooling air by the cooling fan 9 in the engine 7 and this cooling air is supplied to the radiator 16, the oil cooler 17, the intercooler 18, the condenser 19 and the fuel cooler 21, thereby cooling the respective liquids to be cooled.

At this time, since the radiator 16, the oil cooler 17, the intercooler 18, the condenser 19 and the fuel cooler 21 are arranged in the order of the fuel cooler 21 as the primary heat exchanger, the intercooler 18 and the condenser 19 as the secondary heat exchanger and the radiator 16 and the oil cooler 17 as the third heat exchanger from the heat exchanger having a smaller heat release amount in such a manner as to overlap in the flow direction of the cooling air, each heat exchanger can efficiently cool the liquid.

Thus, according to the present embodiment, each of the radiator 16 and the oil cooler 17 having a large heat release amount is arranged at the upstream side of the flow direction A of the cooling air by the cooling fan 9, that is, in parallel with each other in the flow direction A of the cooling air at the front surface side of the cooling fan 9. Each of the intercooler 18 and the condenser 19 having a smaller heat release amount than each of the radiator 16 and the oil cooler 17 is arranged in parallel with each other positioned at the front surface side of the radiator 16 and the oil cooler 17 which is the upstream side in the flow direction A of the cooling air than the radiator 16 and the oil cooler 17. The fuel cooler 21 having the smallest heat release amount is arranged at the front surface side of the condenser 19 which is the upstream side in the flow direction A of the cooling air than the condenser 19.

Accordingly, since the intercooler 18, the fuel cooler 21 and the condenser 19 are arranged such that the heat release amount becomes smaller at the upstream side in the flow direction A of the cooling air and the radiator 16 and the oil cooler 17, each having a larger heat release amount, are arranged at the downstream side, even the radiator 16 and the oil cooler 17 positioned at the downstream side can efficiently release heat of the liquid to be cooled. The condenser 19 and the fuel cooler 21 are formed to have a thickness dimension smaller than that of the intercooler 18 and the fuel cooler 21 is formed in a smaller size than the condenser 19. Accordingly, the condenser 19 and the fuel cooler 21 can be accommodated within a range of the thickness dimension of the intercooler 18 with good release efficiency by arranging the fuel cooler 21 at the front surface side of the condenser 19.

As a result, the radiator 16, the oil cooler 17, the intercooler 18, the condenser 19 and the fuel cooler 21 can be arranged in a compact size in the support body 15 of the heat exchanger unit 14, and the heat exchanger unit 14 can be disposed in a narrow space on the revolving frame 5.

Since the fuel cooler 21 and the condenser 19 are arranged at the downstream side in the flow direction A of the cooling air with reference to the front surface of the intercooler 18, the fuel cooler 21 can be arranged not to project over the front surface of the intercooler 18. Therefore, without increasing a space in a case of installing the radiator 16, the oil cooler 17, the intercooler 18 and the condenser 19, the fuel cooler 21 can be arranged in the same space in addition thereto.

On the other hand, since the dust protective net 24 is provided at the front surface side of the intercooler 18, the condenser 19 and the fuel cooler 21, when the cooling fan 9 sucks in outside air, dusts, insects and the like in the outside air can be trapped by the dust protective net 24. Therefore, one dust protective net 24 can restrict the dusts and the like to be accumulated in the plural heat exchanger units 16 to 19 and 21 to cut down on the number of times of cleaning them. Since the dust protective net 24 provided at the most upstream side position can be easily reached by hand from the exterior housing cover 13, the trapped dusts, insects and the like can be easily cleaned.

The inlet side air hose 25 establishes the connection between the supercharger 7C in the engine 7 and the hose connecting pipe 18D at the inlet side of the intercooler 18, and the outlet side air hose 26 establishes the connection between the hose connecting pipe 18E at the outlet side of the intercooler 18 and the intake manifold 7A in the engine 7. In this case, since each of the air hoses 25 and 26 adopts the molded hose in advance molded bent in a predetermined shape, the air hoses 25 and 26 can be easily mounted and removed to and from the engine 7 and the intercooler 18 to improve an assembly operational efficiency, a maintenance operational efficiency and the like.

Since each of the air hoses 25 and 26 connects the engine 7 and the intercooler 18 to ride over the upper side of the radiator 16 and the oil cooler 17, the air hoses 25 and 26 can be easily removed from the intercooler 18. Each of the air hoses 25 and 26 is formed of a flexible molded hose and can be easily moved, and therefore, the radiator 16 and the oil cooler 17 can be pulled out to the upper side for removal separately, easily performing the cleaning operation, the repair operation and the like thereof.

It should be noted that in the present embodiment, there is exemplified a case where the cooling fan 9 is driven and rotated using the engine 7 as a power source. However, the present invention is not limited to this particular example. For instance, the cooling fan 9 may be driven using a power source different from the engine 7. Particularly, an electric motor, a hydraulic motor or the like may be mounted separately from the engine 7, and the cooling fan 9 may be driven and rotated using the electric motor, the hydraulic motor or the like as a drive source.

In the present embodiment, there is exemplified a case where the crawler type hydraulic excavator 1 is used as the construction machine. However, the present invention is not limited to this particular example. For instance, the present invention may be applied to a hydraulic excavator provided with a wheel type lower traveling structure. Further, the present invention may be widely applied to other construction machines such as a hydraulic crane, a wheel loader, a tractor, and the like.

DESCRIPTION OF REFERENCE NUMERALS

1: Hydraulic excavator (construction machine)
2: Lower traveling structure (vehicle body)
3: Upper revolving structure (vehicle body)
5: Revolving frame
6: Cab
6B: Indoor machine
7: Engine
7A: Intake manifold (intake side)
7B: Exhaust manifold
7C: Supercharger
8: Hydraulic pump
9: Cooling fan
14: Heat exchanger unit
15: Support body
16: Radiator
17: Oil cooler
18: Intercooler
18D: Hose connecting pipe at the inlet side (inlet opening)
18E: Hose connecting pipe at the outlet side (outlet opening)
19: Condenser (outdoor machine)
21: Fuel cooler
24: Dust protective net
25: Inlet side air hose (molded hose)
26: Outlet side air hose (molded hose)
A: Flow direction of the cooling air

What is claimed is:

1. A construction machine comprising: an automotive vehicle body; a cab provided on said vehicle body and equipped with an indoor machine in an air conditioner supplying conditioned air; an engine provided on said vehicle body and equipped with a supercharger; a hydraulic pump which is driven by said engine to pressurize operating oil for supply; a cooling fan which is rotated by receiving power from a power source to suck in outside air as a cooling air; and a heat exchanger unit for cooling a liquid by passage of said cooling air sucked in by said cooling fan through said heat exchanger unit, said heat exchanger unit including a radiator for cooling engine cooling water; an oil cooler for cooling operating oil; an intercooler for cooling intake air supplied from said supercharger in said engine; a condenser serving as an outdoor machine of said air conditioner for cooling a coolant; and a fuel cooler for cooling fuel to be supplied to said engine, said construction machine characterized in that;

said heat exchanger unit is arranged to oppose a front surface side of said cooling fan and is positioned at an upstream side, in a flow direction (A) of said cooling air being sucked in by said cooling fan, and generally parallel to said front surface side of said cooling fan;

said radiator and said oil cooler are positioned at said front surface side of said cooling fan, which position is an upstream side, in the flow direction (A) of said cooling air being sucked in by said cooling fan and are arranged in parallel with each other in the flow direction (A) of said cooling air;

said intercooler and said condenser are arranged in parallel with each other and each are arranged at a front surface side of said radiator and said oil cooler, which arrangement is upstream, in the flow direction (A) of said cooling air, from said radiator and said oil cooler;

said fuel cooler is arranged at a front surface side of said condenser, which arrangement is upstream, in the flow direction (A) of said cooling air, from said condenser; and said fuel cooler and said condenser are arranged at the downstream side in the flow direction (A) of said cooling air from a front surface of said intercooler with reference to the front surface of said intercooler.

2. The construction machine according to claim 1, further comprising: a dust protective net for trapping dust in said cooling air and provided at a front surface side of said intercooler, said condenser and said fuel cooler.

3. The construction machine according to claim 1, further comprising: an inlet side air hose connecting a supercharger of said engine and an inlet opening of said intercooler; and an outlet side air hose connecting an outlet opening of said intercooler and an intake side of said engine, wherein each said air hose adopts a molded hose formed in advance in a predetermined shape by bend molding and is arranged between said engine and said intercooler to ride over a top surface of each of said radiator and said oil cooler.

4. The construction machine according to claim 1, wherein said heat exchanger unit comprises a support body of a frame structure mounted on said vehicle body, and wherein said radiator, said oil cooler, said intercooler, said condenser and said fuel cooler are accommodated in said support body.

5. The construction machine according to claim 1, wherein said vehicle body comprises an automotive lower traveling structure and an upper revolving structure swingably mounted on said lower traveling structure, and wherein said cab, said engine, said hydraulic pump, said cooling fan and said heat exchanger unit are provided on a revolving frame serving as a support structural body of said upper revolving structure.

6. A construction machine comprising: an automotive vehicle body; a cab provided on said vehicle body and equipped with an indoor machine in an air conditioner supplying conditioned air; an engine provided on said vehicle body and equipped with a supercharger; a hydraulic pump which is driven by said engine to pressurize operating oil for supply; a cooling fan which is rotated by receiving power from a power source to suck in outside air as a cooling air; and a heat exchanger unit for cooling a liquid by passage of said cooling air sucked in by said cooling fan through said heat exchanger unit, said heat exchanger unit including a radiator for cooling engine cooling water; an oil cooler for cooling operating oil; an intercooler for cooling intake air supplied from said supercharger in said engine; a condenser serving as an outdoor machine of said air conditioner for cooling a coolant; and a fuel cooler for cooling fuel to be supplied to said engine, said construction machine characterized in that;

said heat exchanger unit is arranged to oppose a front surface side of said cooling fan and is positioned at an upstream side, in a flow direction (A) of said cooling air being sucked in by said cooling fan, and said radiator, oil cooler, intercooler, condenser and fuel cooler being generally parallel to said front surface side of said cooling fan;

said radiator and said oil cooler are positioned at said front surface side of said cooling fan, which position is an upstream side, in the flow direction (A) of said cooling air being sucked in by said cooling fan and are arranged adjacent to each other and are parallel with each other at a first upstream distance from said cooling fan in the flow direction (A) of said cooling air;

said intercooler and said condenser are arranged adjacent to each other and are parallel with each other and each are arranged at a front surface side of said radiator and said oil cooler, which arrangement of said intercooler and said condenser is upstream, in the flow direction (A) of said cooling air, from said radiator and said oil cooler and at a second upstream distance, greater than said first upstream distance from said cooling fan; and said fuel cooler is arranged parallel to said intercooler and at a front surface side of said condenser, which arrangement of said fuel cooler is upstream, in the flow direction (A) of said cooling air, from said condenser and at a third upstream distance, greater than said second upstream distance, from said cooling fan.

7. The construction machine according to claim 6, wherein said fuel cooler and said condenser are arranged at the downstream side in the flow direction (A) of said cooling air from a front surface of said intercooler with reference to the front surface of said intercooler.

8. The construction machine according to claim 6, further comprising: a dust protective net for trapping dust in said cooling air and provided at a front surface side of said intercooler, said condenser and said fuel cooler.

9. The construction machine according to claim 6, further comprising: an inlet side air hose connecting a supercharger of said engine and an inlet opening of said intercooler; and an outlet side air hose connecting an outlet opening of said intercooler and an intake side of said engine, wherein each said air hose adopts a molded hose formed in advance in a predetermined shape by bend molding and is arranged between said engine and said intercooler to ride over a top surface of each of said radiator and said oil cooler.

10. The construction machine according to claim 6, wherein said heat exchanger unit comprises a support body of a frame structure mounted on said vehicle body, and wherein said radiator, said oil cooler, said intercooler, said condenser and said fuel cooler are accommodated in said support body.

11. The construction machine according to claim 6, wherein said vehicle body comprises an automotive lower traveling structure and an upper revolving structure swingably mounted on said lower traveling structure, and wherein said cab, said engine, said hydraulic pump, said cooling fan and said heat exchanger unit are provided on a revolving frame serving as a support structural body of said upper revolving structure.

* * * * *